(No Model.) 7 Sheets—Sheet 1.

C. GUTSMUTHS.
BRUSH MAKING MACHINE.

No. 450,863. Patented Apr. 21, 1891.

Witnesses
Paul Fischer
Carl Gregor P.

Inventor
Carl Gutsmuths
by
Att'ies (No Model.)

C. GUTSMUTHS.
BRUSH MAKING MACHINE.

No. 450,863. Patented Apr. 21, 1891.

Witnesses
Paul Fischer
Carl Gregor

Inventor
Carl Gutsmuths
by
Heuvesal
Att'ies

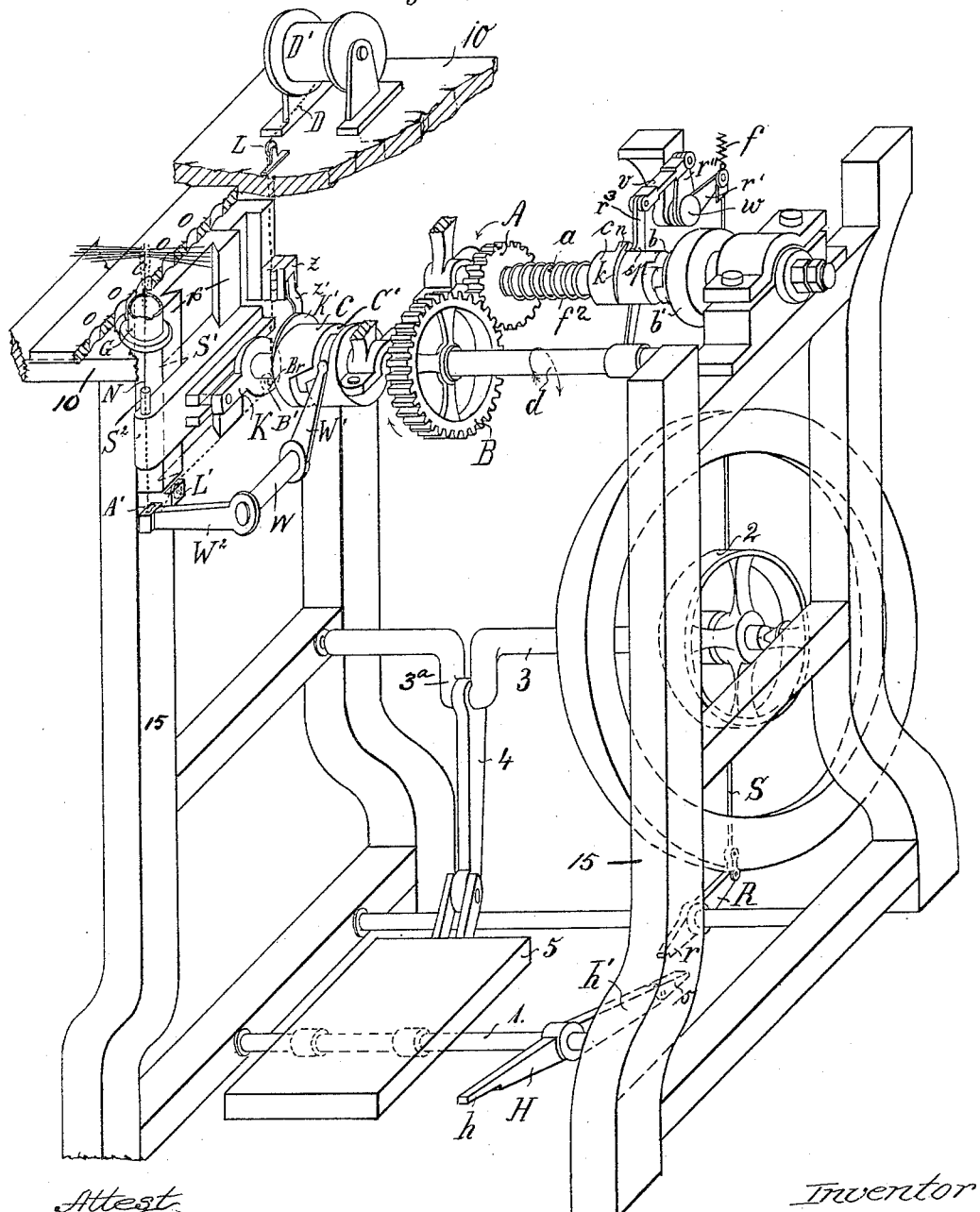

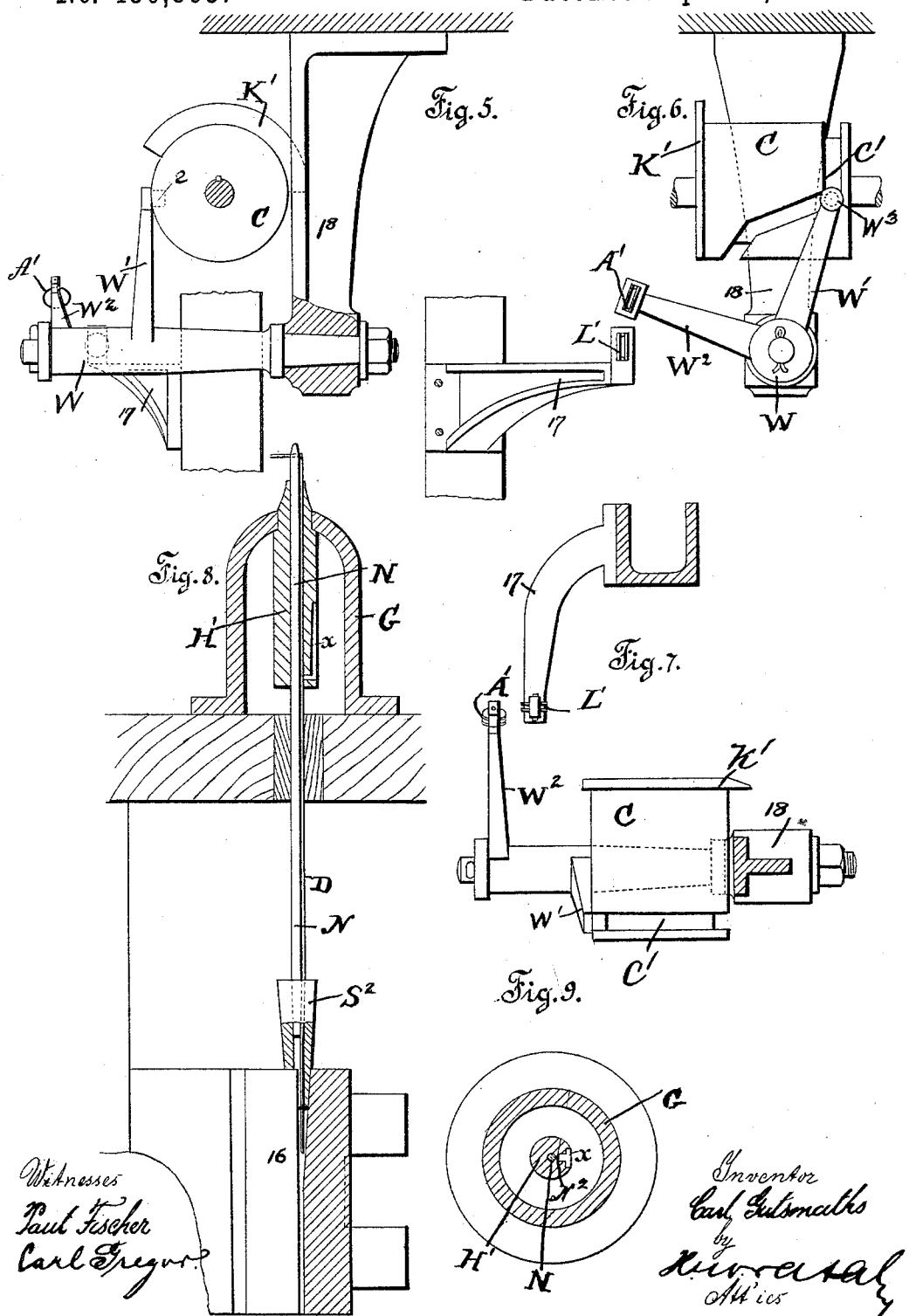

(No Model.) 7 Sheets—Sheet 5.

C. GUTSMUTHS.
BRUSH MAKING MACHINE.

No. 450,863. Patented Apr. 21, 1891.

Witnesses
Paul Fischer
Carl Gregor

Inventor
Carl Gutsmuths
by
Att'ies (No Model.)   7 Sheets—Sheet 6.
C. GUTSMUTHS.
BRUSH MAKING MACHINE.
No. 450,863. Patented Apr. 21, 1891.
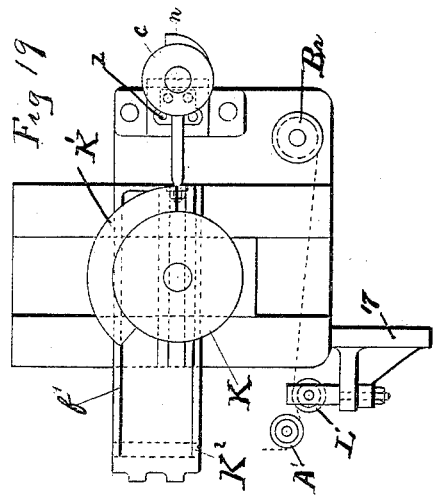
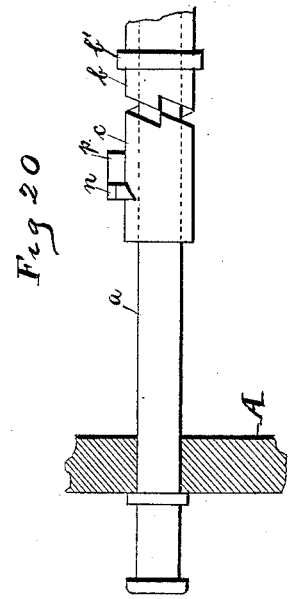
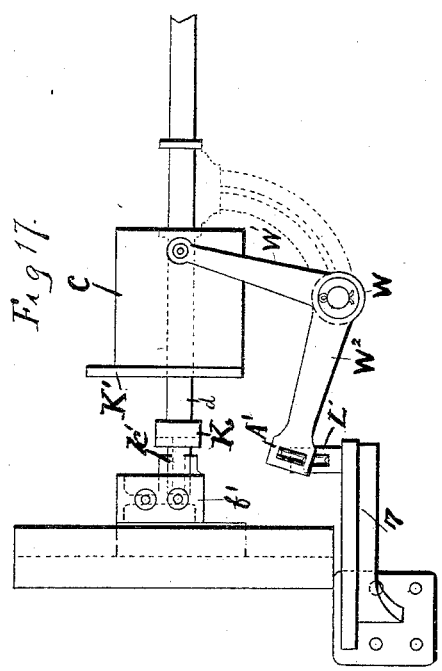
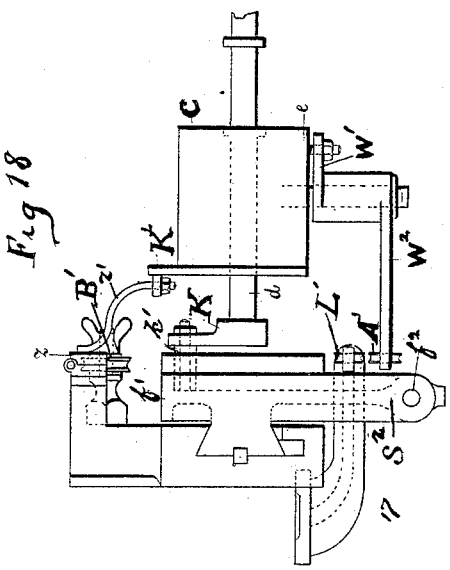
Witnesses.
A. Zickell
H. Nudfeldt.
Inventor
Carl Gutsmuths
by Wm H Babcock
Attorney (No Model.) 7 Sheets—Sheet 7.

C. GUTSMUTHS.
BRUSH MAKING MACHINE.

No. 450,863. Patented Apr. 21, 1891.

Attest
Walter Donaldson
F. L. Middleton

Inventor
Carl Gutsmuths
by Ellis Spear
Att'y

UNITED STATES PATENT OFFICE.

CARL GUTSMUTHS, OF EUTRITZSCH, NEAR LEIPSIC, GERMANY.

BRUSH-MAKING MACHINE.

SPECIFICATION forming part of Letters Patent No. 450,863, dated April 21, 1891.

Application filed November 7, 1887. Serial No. 254,507. (No model.) Patented in Germany May 7, 1886, No. 40,285, and in Austria-Hungary November 16, 1886, No. 29,399, and No. 58,099.

*To all whom it may concern:*

Be it known that I, CARL GUTSMUTHS, engineer, of Eutritzsch, near Leipsic, in the Kingdom of Saxony and German Empire, have invented a new and useful Improvement in Brush-Making Machinery, of which the following is a specification, reference being had therein to the accompanying drawings, no patents being obtained by me anywhere for this invention save in Austria-Hungary Nos. 29,399 and 58,099, dated November 16, 1886, and Germany, No. 40,285, dated May 7, 1886.

This invention relates to a machine by means of which the tufts or bunches of bristles or hairs used in the manufacture of a brush may be drawn by means of binding-wire into the holes or perforations provided in the stock of the brush and adequately secured in place.

In order that this invention may be readily understood, I will proceed to describe the same with reference to the accompanying drawings, wherein—

Figure 1:
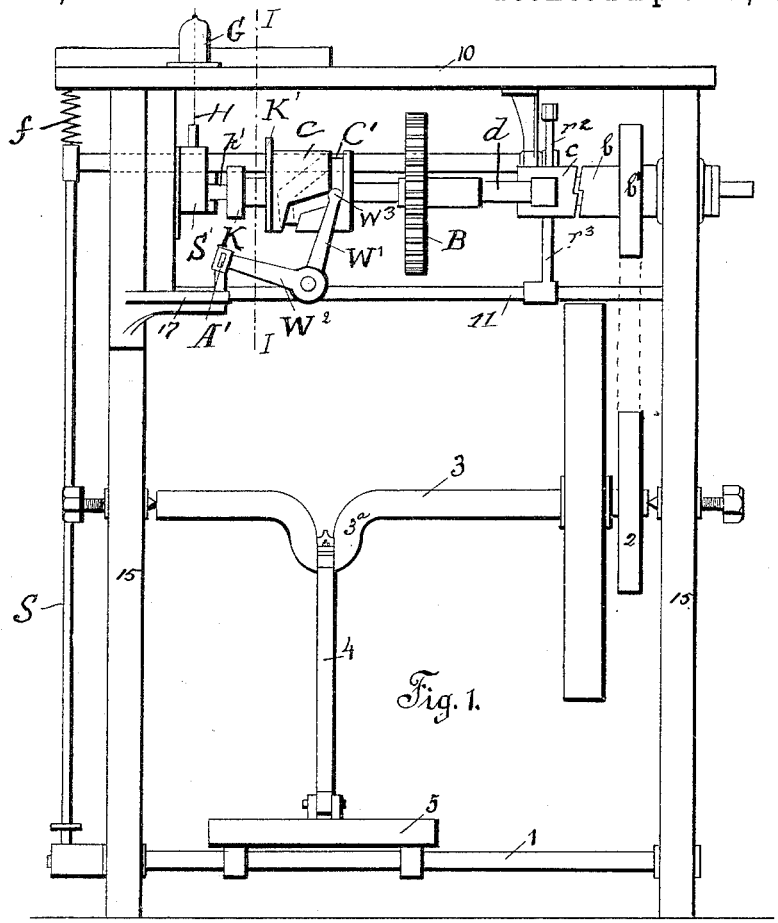
Figure 3:
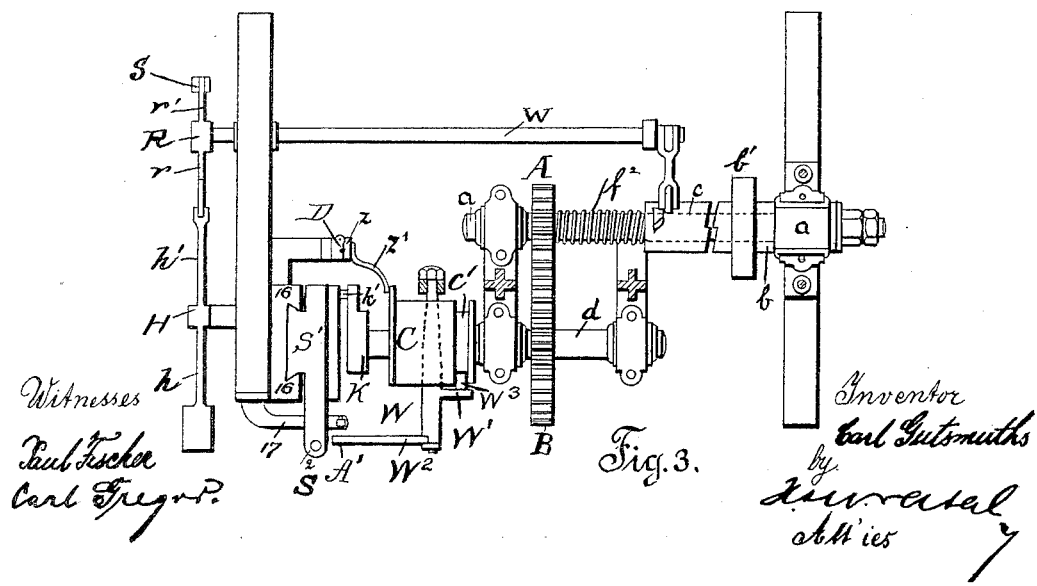
Figure 2:
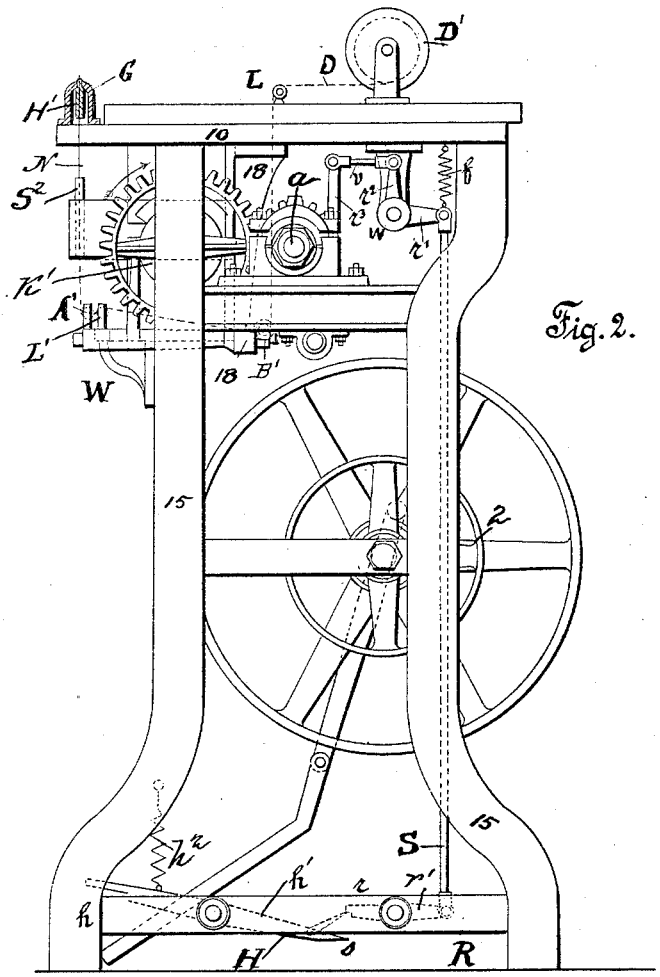
Figure 4:
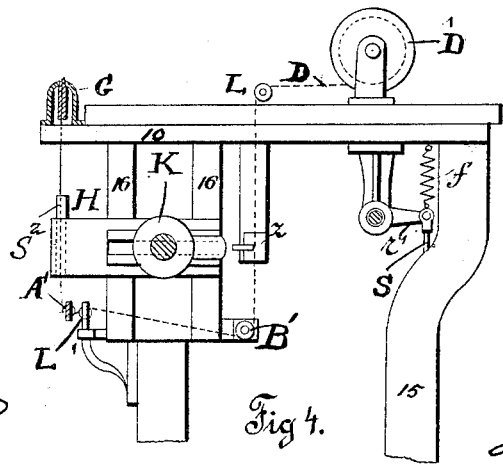
Figures 11, 12:
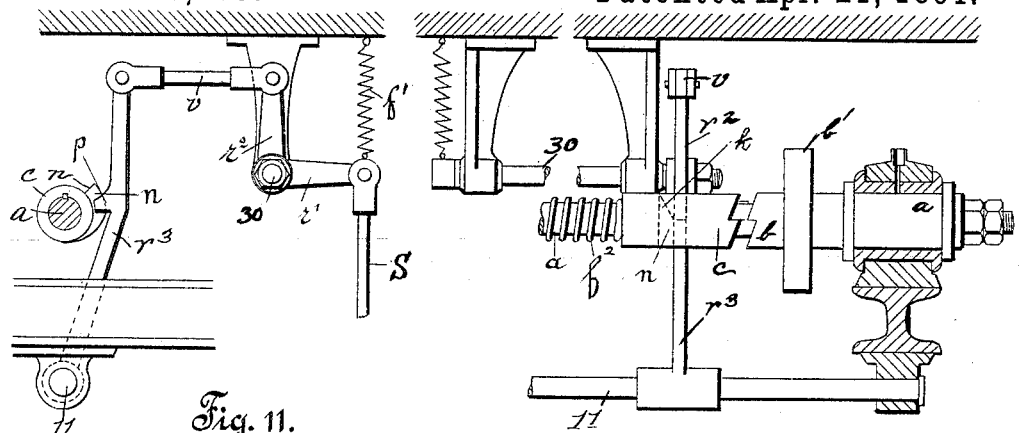
Figures 13, 14, 15:
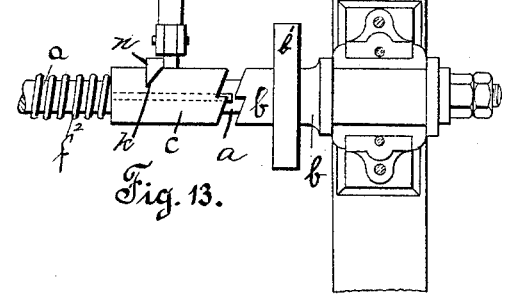
Figures 10, 16:
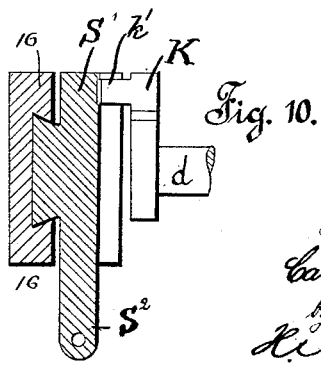
Figure 21:
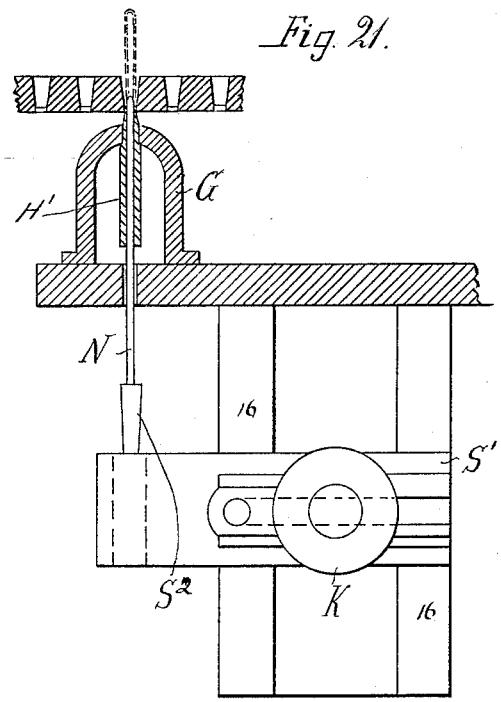
Figure 22:
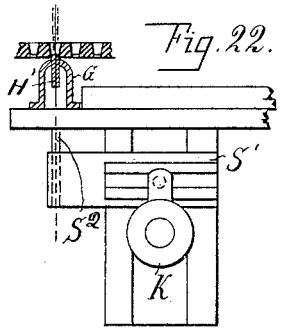
Figure 23:
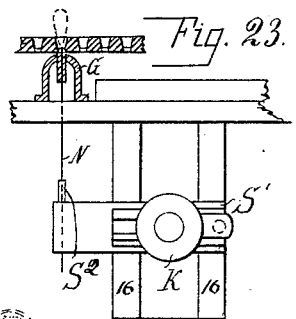
Figure 24:
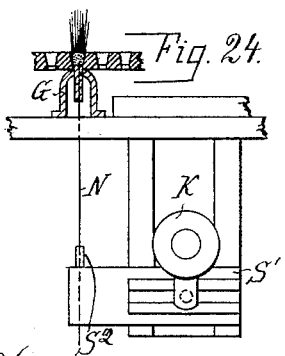
Figure 25:
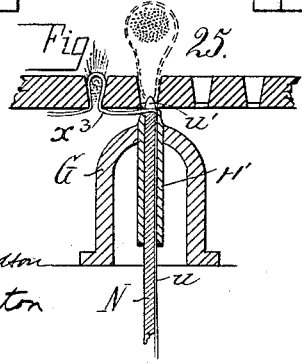
Figure 26:
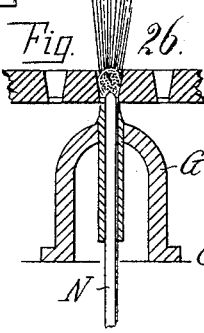

Figure 1 is a front view of the machine. Fig. 2 is a side view. Fig. 3 is a plan view with the table removed. Fig. 4 is a vertical section on line I I of Fig. 1. Fig. $4^a$ is a perspective view of the machine with parts broken away and parts omitted. Fig. 5 is a detail side view of the lever for drawing tight the wire loop to draw in the bunch of bristles and the operating-cam. Fig. 6 is a front and Fig. 7 a plan view of the same. Fig. 8 is a vertical section of the saddle for supporting the brush-blank and the needle-tube with the needle-operating slide, the groove for the passage of the wire being formed in the needle-tube. Fig. 9 is a horizontal section of the same. Fig. 10 is a plan view of the needle-operating slide in section with the operating-crank in plan. Fig. 11 is a detail side view of the clutch-controlling mechanism. Fig. 12 is a front view of the clutch with said mechanism. Fig. 13 is a plan view of the same. Fig. 14 is a side view of the needle. Fig. 15 is a vertical section, and Fig. 16 is a cross-section of the same. Fig. 17 is a detail front view showing the needle-operating slide, its crank-arm, and the shaft therefor with the wire-drawing lever and cam. Fig. 18 is a plan view of the same, showing also the clip for gripping the wire as it is tightened about the bristles. Fig. 19 is a side view. Fig. 20 is a detail view of the clutch. Fig. 21 is a detail of the saddle in section, the needle and operating mechanism in side elevation, and the brush-blank in position, the loop being in dotted lines. Figs. 22, 23, and 24 illustrate the succession of steps in the formation of the loop and the drawing in of the bristles. Figs. 25 and 26 are enlarged detail views of the same.

Referring first to the general views of the machine, Figs. 1, 2, 4, and $4^a$, a saddle G is supported upon the table 10, which in turn is sustained by any suitable frame-work 15. This saddle is preferably rounded on its upper end, and it carries a needle-tube H', arranged centrally thereof and projecting above the rounded end. On this projection and saddle the blanks to which the bristles are to be attached are supported, the needle-tube being adapted to the openings in the brush-blank, as in Figs. 21 to 26.

The needle N which carries the wire reciprocates vertically through the table and its tube and feeds upward sufficient wire at each stroke to form the loop of wire, as indicated in Fig. 25. For this purpose it has an open slit or notch $u'$ in its upper end, Figs. 14 and 15, instead of the ordinary eye. The wire extends through this notch, as in Fig. 25, to the bunch of bristles already drawn in at $X^3$, and when the needle rises the bottom of the slit bears against the wire and forces it upward a sufficient distance to provide wire for a new loop, and upon the descent of the needle the wire thus forced up is left behind and formed into a loop, as hereinafter described, and through this loop a bunch of bristles is inserted with any instrument or shuttle designed for the purpose.

The operation thus far described is shown in Fig. 25. The wire may extend vertically through a groove in the side of the needle, as in Figs. 14 and 15, or through a groove in the needle-tube, as in Figs. 8 and 9. The needle is carried by a holder $S^2$ on a slide $S'$, movable vertically in ways 16 on the frame. The slide $S'$ is in turn moved by a crank-arm K, which is on a rotary shaft $d$, the crank-pin $k'$ entering a horizontal groove on the face of the slide. As in Figs. 2 and 4, the wire D passes from a reel D' on the table, over a sheave L, down under the table, through a suitable opening, through a gripping friction-clip z, hereinafter described, under a sheave B', journaled on the frame, Figs. 4, 4ᵃ, 18, and 19, thence over a sheave L', journaled in the bracket 17 of the frame, thence under a sheave A³, journaled in the end of the arm W² of the wire-tightening bell-crank lever W. It then passes directly to the needle. It will be clearly seen that after the loop is formed, as in Fig. 25, and the bunch of bristles is inserted, the wire must be tightened to draw the middle portions of the bristles into the openings of the blanks, as in Fig. 26, which will cause the ends to project, and the wire must be tightened sufficiently to securely bind the bristles in this position. For doing this, and also for drawing upon the wire sufficiently to form a loop, the crank-arm W² of lever W must be thrown down at the proper time, pressing upon the wire and drawing it down first to form the loop to receive the bristles, and then to tighten about the same. During this tightening action, also, the wire must be held firmly at a point between the reel D' and the tightening-arm W² to prevent drawing more wire from the reel, and the gripping-clip z is provided for this purpose; and, supposing this part is performing its function properly to grip the wire, it will be readily seen that downward movement of the arm W² will draw the wire down along the needle, binding it at the loop about the bristles. The bell-crank W is journaled in a bracket 18 depending from beneath the table, Figs. 2, 5, 6, and 7, and it is operated after the descent of the needle by a peripheral cam-groove C' in a cam C, fixed on the rotary shaft d. The action of the gripping-clip z must be intermittent—that is, it must hold the wire while the tightening-arm W² is moving down to draw in and bind the bristles, and it must release the wire when the needle rises to force up a new length for the next loop. It is composed of two sections hinged together, Figs. 3, 4ᵃ, and 18, between which the wire passes through a suitable channel. The outer movable section is provided with a spring-arm z', which extends into the path of the cam-flange K, extending partially around the cam C, so that during part of the revolution of the cam the flange K will bear upon the spring-arm z' and apply pressure to the clip for gripping the wire. The flange is located in relation to the cam-groove C', and these parts are relatively timed in order that the grip will act while the arm W² is drawing tight the wire. During the remainder of the revolution the grip is released, as the flange does not extend all the way around. The shaft d is driven from the shaft a by a gear B on shaft d, and a pinion A on the shaft a, so that a complete revolution of the shaft a imparts a half-revolution to the shaft d. The crank-lever W is operated to draw upon the wire at each movement of the shaft d, the first movement forming the loop for the reception of the bristles, and the further downward movement of the arm W² tightening and binding the wire to the bristles. The movement of the shaft a is controlled by a clutch consisting of a toothed jaw c, arranged to slide longitudinally on the shaft, and under pressure of the spring $f^2$ and a jaw b, freely revoluble on the shaft a, and having a pulley b' combined therewith. This jaw is driven from a pulley 2 on a shaft 3, which is operated from a treadle by pitman 4, connected with the crank 3ᵃ. The sliding jaw C of the clutch has a wedge-shaped projection n extending partially around its periphery, and extending near the path of this projection there is a lever $r^3$, pivoted to the frame at 11, Figs. 1, 2, 4ᵃ, 11, 12, and 13, which likewise has a projection p, and this is in the path of the projection n. Obviously when the revolution of the shaft a brings the projection n against the projection p the clutch-jaw c will be shifted and the revolution will cease until the lever $r^3$ is operated and the holding projection p removed from the projection n. The lever $r^3$ is operated quickly to release the sliding jaw and to immediately return to operative position to push it back when the lug n comes around. The shaft thus makes one revolution at a time, and is automatically stopped at the end of each rotation. Each revolution, as before stated, revolves the shaft d one-half. The first half revolution forms the loop, after which the movement ceases until the bristles are placed therein. Then the lever $r^3$ is withdrawn a second time and the crank-lever W is again operated by the completion of the revolution of the shaft d, and the bristles are thus bound by the wire, after which there is another pause in the movement while the brush-blank is being shifted. The lever $r^3$ is operated from a treadle H on the rod i, which has a pivoted latch-point s, arranged to engage the under side of the lever R and raise it. The latch s has pivotal movement only upward and for this rising action it is rigid. The lever R is connected through a rod S with an arm r' of a crank-lever pivoted on a rod held in hangers beneath the table-top, and the other arm $r^2$ of this lever is connected by a link v with the lever $r^3$. The lever is held in normal position by a spring f, which draws up the rod S. In operating these parts the treadle-arm h is depressed, raising the arm h' and causing the latch s to operate the lever R against the tension of the spring f and withdraw the projection p of the lever $r^3$, allowing the sliding jaw of the clutch to engage with the revolving portion b to rotate the shaft a. The lever $r^3$ and its operating connections return at once to normal position under the action of the spring f, and the clutch is disengaged when the shaft a completes its revolution. The treadle H is under tension of a spring $h^2$, Fig. 2. A spring x, Fig. 8, may be provided, attached to the needle-tube and extending through the same to bear upon the wire and apply a tension to the same.

I claim as my invention—

1. In combination, the saddle G, having the needle-tube projecting therefrom to receive the brush-blanks, the needle arranged to reciprocate through the saddle and carry the wire, and means for drawing the wire backward along the needle, substantially as described.

2. In combination, the saddle G to receive the brush-blanks, the reciprocating needle having a slit $u'$, open at its upper end to engage and move the wire upward, and means for drawing the wire backward along the needle, substantially as described.

3. In combination, the needle for drawing the wire, with operating means, the crank-arm W for retracting the wire, the cam for operating said arm, the clip located at a point between the retracting-arm W and the reel for holding the wire, and the cam for positively operating said clip while the retracting-arm is drawing the wire back, substantially as described.

4. In combination, the needle, the crank-arm W and operating means therefor, the shaft $a$, and the shaft $d$, geared thereto for communicating motion to said operating means, the clutch $b\ c$ on the shaft $a$, and the operating means consisting of the lever $r^3$, the treadle H, and suitable operating connections from the treadle to the lever, substantially as described.

In witness whereof I have hereunto set my hand in presence of two witnesses.

CARL GUTSMUTHS.

Witnesses:
GEORG SARTMANN,
MORITZ BAUERMANN.